United States Patent
Shimada et al.

(10) Patent No.: US 6,767,946 B2
(45) Date of Patent: Jul. 27, 2004

(54) WATER AND OIL REPELENT COMPOSITION AND SHAPED PRODUCT THEREOF

(75) Inventors: Toyomichi Shimada, Yokohama (JP); Masako Tada, Yokohama (JP); Takashige Maekawa, Yokohama (JP)

(73) Assignee: Asahi Glass Company, Limited, Tokyo (JP)

(*) Notice: Subject to any disclaimer, the term of this patent is extended or adjusted under 35 U.S.C. 154(b) by 2 days.

(21) Appl. No.: 10/252,604

(22) Filed: Sep. 24, 2002

(65) Prior Publication Data

US 2003/0100639 A1 May 29, 2003

(30) Foreign Application Priority Data

Sep. 25, 2001 (JP) .......................... 2001-291802

(51) Int. Cl.$^7$ ................................. C08L 5/20
(52) U.S. Cl. .................... 524/212; 524/213; 524/216; 524/196; 524/197; 524/198; 524/199; 524/200; 524/582; 524/570
(58) Field of Search ................. 524/462, 463, 524/196, 197, 198, 199, 200, 570

(56) References Cited

U.S. PATENT DOCUMENTS

| | | | | |
|---|---|---|---|---|
| 4,504,401 A | * | 3/1985 | Matsuo et al. | 252/8.75 |
| 4,525,305 A | * | 6/1985 | Patel | 554/91 |
| 4,788,287 A | * | 11/1988 | Matsuo et al. | 544/196 |
| 4,792,354 A | * | 12/1988 | Matsuo et al. | 106/2 |
| 4,962,156 A | | 10/1990 | Shinjo et al. | 525/100 |
| 5,079,299 A | | 1/1992 | Hisamoto et al. | 525/100 |
| 5,502,225 A | * | 3/1996 | Kleiner et al. | 554/42 |
| 5,548,022 A | | 8/1996 | Ito et al. | 524/839 |
| 5,578,688 A | | 11/1996 | Ito et al. | 526/245 |
| 5,580,645 A | * | 12/1996 | Kirchner | 442/80 |
| 6,013,732 A | * | 1/2000 | Yamana et al. | 525/123 |
| 6,177,531 B1 | | 1/2001 | Shimada et al. | 526/245 |
| 6,207,777 B1 | | 3/2001 | Shimada et al. | 526/245 |
| 6,251,984 B1 | * | 6/2001 | Shimada et al. | 524/507 |
| 6,376,592 B1 | | 4/2002 | Shimada et al. | 524/457 |
| 6,395,821 B1 | | 5/2002 | Shimada et al. | 524/520 |
| 2003/0100639 A1 | * | 5/2003 | Shimada et al. | 524/186 |

FOREIGN PATENT DOCUMENTS

| | | |
|---|---|---|
| JP | 6-184354 | 7/1994 |
| JP | 6-200073 | 7/1994 |
| WO | WO 01/64619 | 9/2001 |

* cited by examiner

Primary Examiner—David W. Wu
Assistant Examiner—Rip A Lee
(74) Attorney, Agent, or Firm—Oblon, Spivak, McClelland, Maier & Neustadt, P.C.

(57) ABSTRACT

A water and oil repellent composition comprising a compound of the following formula (1) and a thermoplastic polymer, as essential components:

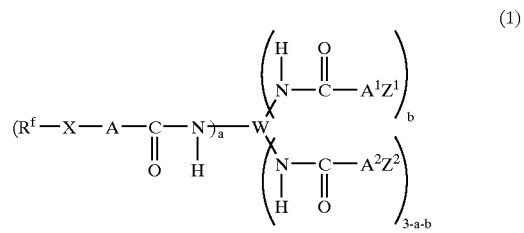

(1)

where the symbols in the formula (1) have the following meanings:

$R^f$: a $C_{1-20}$ polyfluoroalkyl group,

X: $(CH_2)_m$, wherein m is an integer of from 1 to 10,

A, $A^1$, $A^2$: each independently, O, S or $N(Z^3)$, wherein $Z^3$ is a hydrogen atom or an alkyl group, $Z^1$: an octadecyl group, $Z^2$: an alkyl group, or an alkyl group having at least one hydrogen atom substituted, W: a trivalent organic group, and a, b: each independently, 1 or 2, provided that a+b is 2 or 3.

13 Claims, No Drawings

WATER AND OIL REPELENT COMPOSITION AND SHAPED PRODUCT THEREOF

The present invention relates to a water and oil repellent composition comprising a specific compound having a polyfluoroalkyl group and a thermoplastic polymer, and a shaped product such as a film or fiber formed from such a composition.

As a shaped product such as a film or fiber having water and oil repellency, and as a composition to be used for its production, a composition comprising a fluoroaliphatic group-containing piperazine compound and a thermoplastic polymer, and a shaped product formed from such a composition (JP-A-6-184354), or a composition comprising a fluoroaliphatic group-containing amino alcohol and a thermoplastic polymer, and a shaped product formed from such a composition (JP-A-6-200073), are, for example, known.

However, with such conventional water and oil repellent compositions, the water and oil repellency was not sufficient, and a composition which is capable of providing better water and oil repellency, has been desired.

It is an object of the present invention to provide a water and oil repellent composition which is capable of imparting excellent water and oil repellency, and a shaped product excellent in water and oil repellency, which contains such a composition.

The present invention has been made to solve the above-mentioned problem and provides a water and oil repellent composition comprising a compound of the following formula (1) (hereinafter referred to also as Compound 1, and other compounds may also be referred to similarly) and a thermoplastic polymer, as essential components:

$$(R^f-X-A-\underset{\underset{O}{\|}}{C}-\underset{\underset{H}{|}}{N})_a-W\begin{pmatrix} \underset{\underset{N}{|}}{H}-\underset{\underset{}{\|}}{C}-A^1Z^1 \\ \underset{H}{|} \\ N-\underset{\underset{}{\|}}{C}-A^2Z^2 \\ \underset{H}{|} \\ H \quad O \end{pmatrix}_{3-a-b}^{b} \quad (1)$$

where the symbols in the formula (1) have the following meanings:

$R^f$: a $C_{1-20}$ polyfluoroalkyl group,
X: $(CH_2)_m$, wherein m is an integer of from 1 to 10,
A, $A^1$, $A^2$: each independently, O, S or $N(Z^3)$, wherein $Z^3$ is a hydrogen atom or an alkyl group,
$Z^1$: an octadecyl group,
$Z^2$: an alkyl group, or an alkyl group having at least one hydrogen atom substituted,
W: a trivalent organic group, and
a, b: each independently, 1 or 2, provided that a+b is 2 or 3.

Further, the present invention provides a shaped product formed from such a water and oil repellent composition.

Now, the present invention will be described in detail with reference to the preferred embodiments.

In this specification, a polyfluoroalkyl group is represented by a $R^f$ group.

In Compound 1, $R^f$ is a $C_{1-20}$ linear or branched $R^f$ group.

The carbon number of the $R^f$ group is preferably from 4 to 20, particularly preferably from 4 to 16. If the carbon number of the $R^f$ group is within the above range, the water and oil repellency of Compound 1 is excellent, such being preferred.

The number of fluorine atoms in the R group is preferably at least 60%, particularly preferably at least 80%, when it is represented by the formula of [(number of fluorine atoms in the R group)/(number of hydrogen atoms contained in an alkyl group having the same carbon number as in the $R^f$ group)]×100(%).

The $R^f$ group may contain halogen atoms other than fluorine atoms. As such other halogen atoms, chlorine atoms are preferred. Further, between the carbon-carbon bond in the $R^f$ group, an etheric oxygen atom or a thioetheric sulfur atom may be inserted.

The structure of the terminal portion of the $R^f$ group may, for example, be $-CF_3$, $-CH_2H$, $-CFH_2$ or $-CF_2Cl$, and $-CF_3$ is particularly preferred.

As the $R^f$ group, a linear group is preferred, and a perfluoroalkyl group (hereinafter referred to also as a $R^F$ group) is particularly preferred, since Compound 1 is thereby excellent in water and oil repellency. In Compound 1, X is $-(CH_2)_m-$ wherein m is an integer of from 1 to 10. Further, each of A, $A^1$ and $A^2$ is $-O-$, $-S-$ or $-N(Z^3)-$, wherein $Z^3$ is a hydrogen atom or an alkyl group. A is preferably $-O-$.

As $R^f-X-A-$ in Compound 1, the following specific examples may preferably be mentioned.

$F(CF_2)_4(CH_2)_2O-$, $F(CF_2)_6(CH_2)_2O-$, $F(CF_2)_{10}(CH_2)_2O-$, $F(CF_2)_{12}(CH_2)_2O-$, $F(CF_2)_{14}(CH_2)_2O-$, $F(CF_2)_{16}(CH_2)_2O-$, $F(CF_2)_{18}(CH_2)_2O-$, $F(CF_2)_{20}(CH_2)_2O-$, $F(CF_2)_8(CH_2)_3O-$, $F(CF_2)_{10}(CH_2)_3O-$, $F(CF_2)_{12}(CH_2)_3O-$, $F(CF_2)_4(CH_2)_4O-$, $F(CF_2)_6(CH_2)_4O-$, $F(CF_2)_8(CH_2)_6O-$, $F(CF_2)_{10}(CH_2)_6O-$, $F(CF_2)_4(CH_2)_2S-$, $H(CF_2)_{12}(CH_2)_3O-$.

In Compound 1, $A^1$ is preferably $-O-$ or $-S-$. Further, $Z^1$ is an octadecyl group, and a linear octadecyl group is particularly preferred, since it is excellent in water repellency.

In Compound 1, $A^2$ is preferably $-O-$ or $-N(Z^3)-$. $Z^3$ is preferably a hydrogen atom or a $C_{1-3}$ alkyl group, since the synthesis of Compound 1 is thereby easy. Further, $Z^2$ is an alkyl group, or an alkyl group having at least one hydrogen atom substituted. $Z^2$ is preferably a substituted alkyl group having a carbon number of at least 1.

In Compound 1, $-A^2-Z^2$ is preferably an alkoxy group, a substituted alkoxy group, a mono- or di-alkylamino group or a substituted alkylamino group. Particularly preferred is a substituted alkoxy group or a substituted amino group. The substituted alkoxy group may preferably be a 2,3-epoxypropoxy group, a 2-cyanoethoxy group, a 2-nitroethoxy group or a 2-hydroxyethoxy group. The substituted amino group may preferably be a hydroxymethylamino group, a 2-hydroxyethylamino group, an aziridinyl group, a bis(2-hydroxyethyl)amino group or a 2-(2,3-epoxypropoxy)ethylamino group.

In Compound 1, W is a trivalent organic residue having three $-NCO$ groups derived from a trifunctional isocyanate compound.

As the trifunctional isocyanate compound, a biuret-modified product of hexamethylene diisocyanate (hereinafter referred to as HDI), an adduct of trimethylolpropane and tolylene diisocyanate (hereinafter referred to as TDI), an adduct of trimethylolpropane and HDI, or an isocyanurate modified product of TDI, HDI or isophorone diisocyanate, may, for example, be mentioned.

Further, each of a and b which are independent of one another, is 1 or 2.

Compound 1 can be synthesized by reacting $R^f$—X—A—H and $Z^1$—$A^1$—H and, if necessary, $Z^2$—$A^2$—H, to the above-mentioned trifunctional isocyanate compound. As Compound 1, the following specific examples may be mentioned as preferred.
(2)
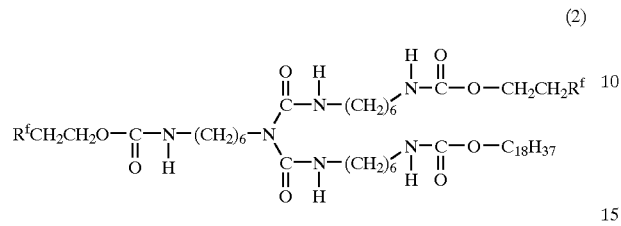
(3)
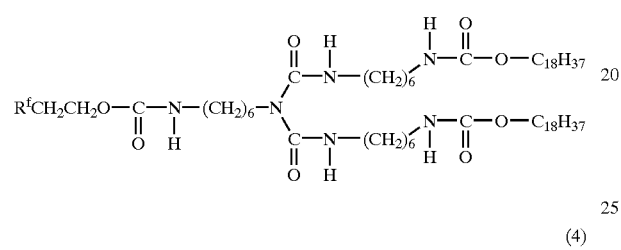
(4)
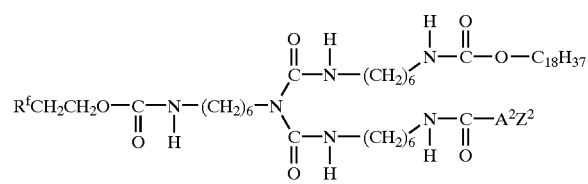
(5)
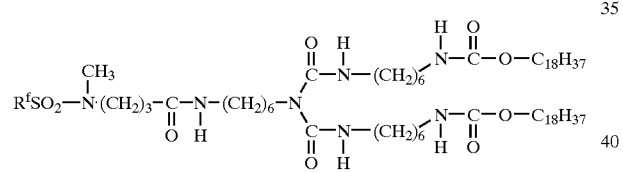
(6)
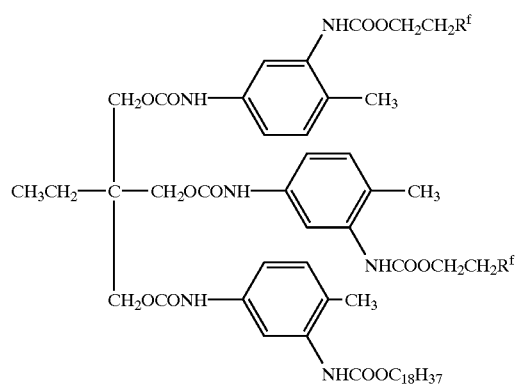
(7)
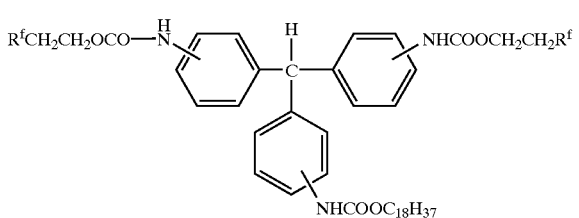
(8)
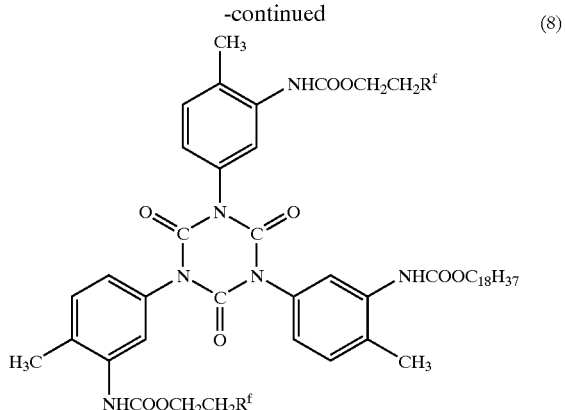
(9)
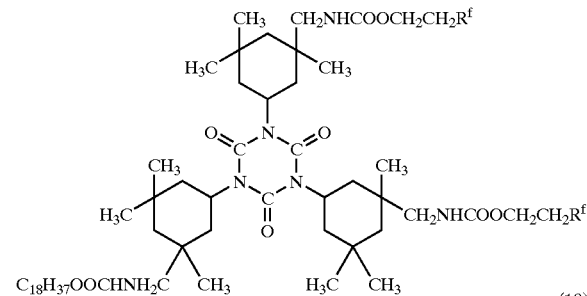
(10)
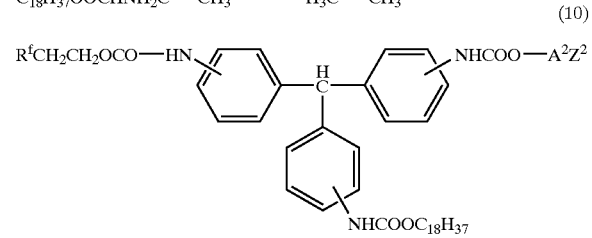
(11)
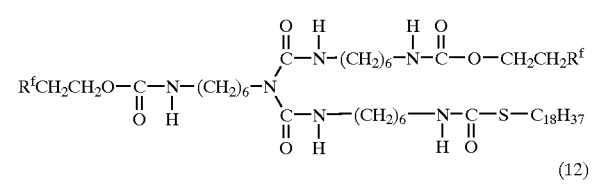
(12)
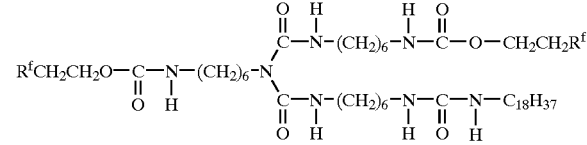
(13)
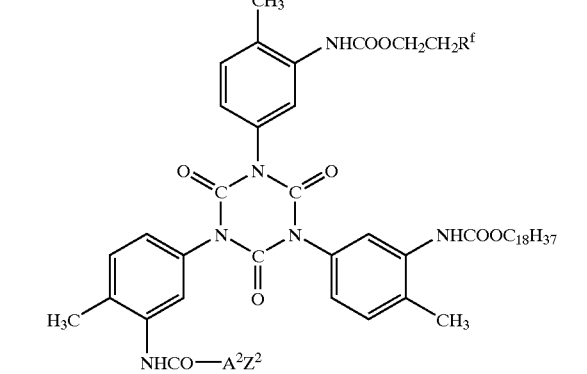

In the water and oil repellent composition of the present invention, Compound 1 may be of one type, or two or more types. At that time, the $R^f$ group may be of one type, or two or more types.

The content of Compound 1 in the water and oil repellent composition is preferably from $_{100}$ to $_{10,000}$ ppm.

In the present invention, the thermoplastic polymer may, preferably, be a polyamide such as nylon 6 or nylon 66, a polyester such as polyethylene terephthalate, a polyolefin such as polyethylene or polypropylene, or a polyurethane.

The water and oil repellent composition of the present invention is prepared by mixing Compound 1 with the thermoplastic polymer in a powder form or in a pellet form. The mixing may be carried out in one step or may be carried out in two steps via a concentrate so-called a master batch. Further, Compound 1 in a state as dissolved or dispersed in a solvent, may be dried to remove the solvent and then mixed with the thermoplastic polymer. The mixing is preferably carried out to be uniform.

The obtained water and oil repellent composition may be melt-extruded to form a shaped product such as a film or fiber. After the melt extrusion, the film or fiber may be subjected to annealing for the purpose of further improving the oil and water repellency. The annealing is preferably carried out for from a few tens seconds to a few minutes at a temperature of not higher than the melting point of the thermoplastic polymer.

Now, the present invention will be described in further detail with reference to Preparation Examples (Examples 1 to 3), Working Examples (Examples 4 to 6) and Comparative Example (Example 7). However, it should be understood that the present invention is by no means restricted to such specific Examples.

EXAMPLE 1

Into a four-necked flask having an internal capacity of 1 l and equipped with a dropping funnel, a thermometer, a condenser and a stirrer, 96 g of a biuret-modified product of HDI (molecular weight: 478), 0.05 g of dibutyltin dilaurate and 100 g of methyl isobutyl ketone (hereinafter referred to as MIBK) were charged, and stirring was initiated.

Then, the air in the above flask was substituted by dry nitrogen, and then, while maintaining the liquid temperature in the flask at 80° C., 54 g of octadecyl alcohol (molecular weight: 270), 15 g of glycidol (molecular weight: 74) and 53 g of $C_4F_9CH_2CH_2OH$ (molecular weight: 264) were dropwise added into the flask over a period of 1 hour by means of the dropping funnel, and stirring was continued for further 3 hours.

After completion of the reaction, MIBK was distilled off. The conversion of the biuret modified product of HDI was 100%. From the analytical results of the infrared absorption spectrum and NMR, it was confirmed that 216 g of a compound of the following Formula (14) was obtained.

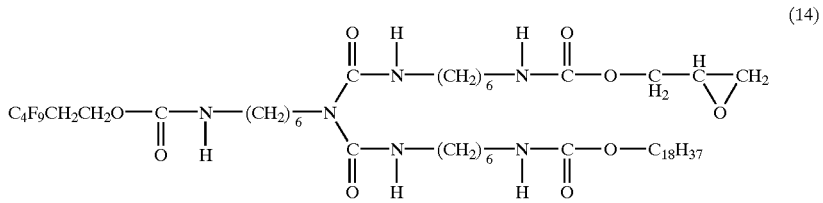

(14)

EXAMPLE 2

The following Compound (15) was prepared in the same manner as in Example 1 except that in Example 1, 108 g of octadecyl alcohol was used without using glycidol, and instead of 53 g of $C_4F_9CH_2CH_2OH$, 93 g of $C_8F_{17}CH_2CH_2OH$ (molecular weight: 464) was used.

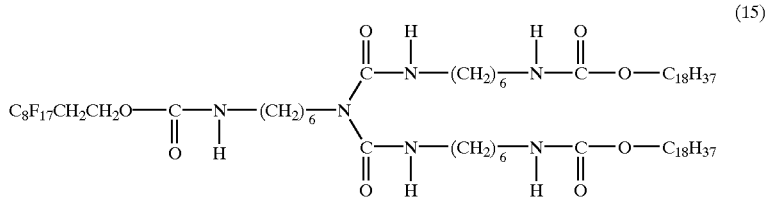

(15)

EXAMPLE 3

The following Compound (16) was prepared in the same manner as in Example 1 except that in Example 1, instead of 53 g of $C_4F_9CH_2CH_2OH$, 93 g of $C_8F_{17}CH_2CH_2OH$ (molecular weight: 464), was used.

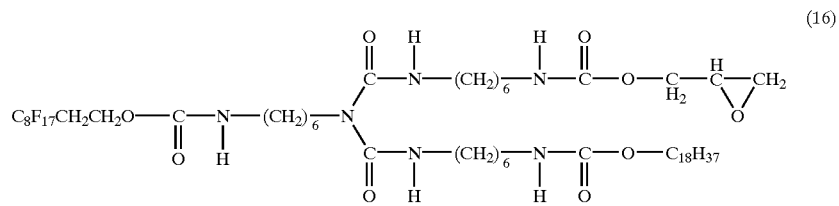

(16)

EXAMPLE 4

One part by mass of Compound 14 and 99 parts by mass of polypropylene resin pellets (melt flow rate 800) were mixed. Then, 50 g of the mixture was introduced into a kneader and mixed at 200° C. for 5 minutes, whereupon a film was prepared by a press forming machine.

And, the contact angles of hexadecane (hereinafter referred to as HD), water and isopropyl alcohol (hereinafter referred to as IPA) against the film surface, were measured, and the oil repellency and the water repellency were evaluated. The results are shown in Table 1.

Further, with respect to the above film, annealing was carried out at 120° C. for 10 minutes, whereupon the contact angles were measured and evaluated in the same manner.

EXAMPLES 5 AND 6

In the same manner as in Example 4 except that Compound 15 or Compound 16 was used instead of Compound 14, the contact angles were measured and evaluated.

EXAMPLE 7

Using polypropylene resin pellets only, evaluation was carried out in the same manner as in Example 4.

TABLE 1

| Examples | Initial stage | | | After annealing | | |
|---|---|---|---|---|---|---|
| | HD | Water | IPA | HD | Water | IPA |
| 4 | 50° | 110° | 35° | 58° | 114° | 52° |
| 5 | 58° | 120° | 40° | 67° | 123° | 57° |
| 6 | 60° | 122° | 45° | 68° | 123° | 53° |
| 7 | 0° | 104° | 0° | 0° | 104° | 0° |

The water and oil repellent composition of the present invention is excellent in water and oil repellency, and also a shaped product such as a film or fiber containing such a composition, has excellent water and oil repellency.

The entire disclosure of Japanese Patent Application No. 2001-291802 filed on Sep. 25, 2001 including specification, claims and summary are incorporated herein by reference in its entirety.

What is claimed is:

1. A water and oil repellent composition comprising a compound of the following formula (1) and a thermoplastic polymer $$(R^f-X-A-\underset{\underset{O}{\|}}{C}-\underset{\underset{H}{|}}{N})_a-W\begin{pmatrix}\underset{\underset{H}{|}}{N}-\underset{\underset{O}{\|}}{C}-A^1Z^1\end{pmatrix}_b \begin{pmatrix}\underset{\underset{H}{|}}{N}-\underset{\underset{O}{\|}}{C}-A^2Z^2\end{pmatrix}_{3-a-b} \quad (1)$$

where the symbols in the formula (1) have the following meanings:

$R^f$: a $C_{1-20}$ polyfluoroalkyl group,
X: $(CH_2)_m$, wherein m is an integer of from 1 to 10,
A, $A^1$, $A^2$: each independently, O, S or $N(Z^3)$, wherein $Z^3$ is a hydrogen atom or an alkyl group,
$Z^1$: an octadecyl group,
$Z^2$: an alkyl group, or an alkyl group having at least one hydrogen atom substituted,
W: a trivalent organic group, and
a, b: each independently, 1 or 2, provided that a+b is 2 or 3, wherein the composition is obtained by mixing the compound as is or dried to remove any solvent in which the compound was dissolved or dispersed, with the thermoplastic polymer in powder or pellet form, and wherein the compound is present in an amount of from 100 to 10,000 ppm based on the composition.

2. The water and oil repellent composition according to claim 1, wherein W in the compound is a trivalent organic residue having three-NCO groups derived from a trifunctional isocyanate compound.

3. The water and oil repellent composition according to claim 1, wherein each of A, $A^1$ and $A^2$ in the compound is O.

4. The water and oil repellent composition according to claim 1, wherein —$A^2$—$Z^2$ in the compound, is a 2,3-epoxypropoxy group, a 2-cyanoethoxy group, a 2-nitroethoxy group, a 2-hydroxyethoxy group, a hydroxymethylamino group, a 2-hydroxyethylamino group, an azirinyl group, a bis(2-hydroxyethyl)amino group or a 2-(2,3-epoxypropoxy)ethylamino group.

5. The water and oil repellent composition according to claim 1, wherein the thermoplastic polymer is a polyolefin, a polyamide, a polyester or a polyurethane.

6. The water and oil repellent composition according to claim 2, wherein each of A, $A^1$ and $A^2$ in the compound is O.

7. The water and oil repellent composition according to claim 2, wherein —$A^2$—$Z^2$ in the above compound, is a 2,3-epoxypropoxy group, a 2-cyanoethoxy group, a 2-nitroethoxy group, a 2-hydroxyethoxy group, a hydroxymethylamino group, a 2-hydroxyethylamino group, an azirinyl group, a bis(2-hydroxyethyl)amino group or a 2-(2,3-epoxypropoxy)ethylamino group.

8. The water and oil repellent composition according to claim 2, wherein the thermoplastic polymer is a polyolefin, a polyamide, a polyester or a polyurethane.

9. The water and oil repellent composition according to claim 3, wherein —$A^2$—$Z^2$ in the compound, is a 2,3-epoxypropoxy group, a 2-cyanoethoxy group, a 2-nitroethoxy group, a 2-hydroxyethoxy group, a hydroxymethylamino group, a 2-hydroxyethylamino group, an azirinyl group, a bis(2-hydroxyethyl)amino group or a 2-(2,3-epoxypropoxy)ethylamino group.

10. The water and oil repellent composition according to claim 3, wherein the thermoplastic polymer is a polyolefin, a polyamide, a polyester or a polyurethane.

11. A shaped product formed from the water and oil repellent composition as defined in claim 1.

12. A water and oil repellent composition comprising a compound of the following formula (1) and a thermoplastic polymer selected from the group consisting of a polyolefin and a polyurethane:

$$(R^f-X-A-\underset{\underset{O}{\|}}{C}-\underset{\underset{H}{|}}{N})_a-W\begin{pmatrix}\underset{\underset{H}{|}}{N}-\underset{\underset{O}{\|}}{C}-A^1Z^1\end{pmatrix}_b \begin{pmatrix}\underset{\underset{H}{|}}{N}-\underset{\underset{O}{\|}}{C}-A^2Z^2\end{pmatrix}_{3-a-b} \quad (1)$$

where the symbols in the formula (1) have the following meanings:

$R^f$: a $C_{1-20}$ polyfluoroalkyl group,

X: $(CH_2)_m$, wherein m is an integer of from 1 to 10,

A, $A^1$, $A^2$: each independently, O, S or $N(Z^3)$, wherein $Z^3$ is a hydrogen atom or an alkyl group, $Z^1$: an octadecyl group, $Z^2$: an alkyl group, or an alkyl group having at least one hydrogen atom substituted, W: a trivalent organic group, and a, b: each independently, 1 or 2, provided that a+b is 2 or 3.

13. The water and oil repellent composition according to claim 12, wherein the thermoplastic polymer is polypropylene.

* * * * *

UNITED STATES PATENT AND TRADEMARK OFFICE
CERTIFICATE OF CORRECTION

PATENT NO.    : 6,767,946 B2
DATED         : July 27, 2004
INVENTOR(S)   : Shimada et al.

It is certified that error appears in the above-identified patent and that said Letters Patent is hereby corrected as shown below:

Title page, Item [54] and Column 1, lines 1-3,
Title, should read -- WATER AND OIL REPELLENT COMPOSITION AND SHAPED PRODUCT THEREOF --

Signed and Sealed this

Thirtieth Day of November, 2004

JON W. DUDAS
*Director of the United States Patent and Trademark Office*